US012375295B2

United States Patent
Wilkerson et al.

(10) Patent No.: US 12,375,295 B2
(45) Date of Patent: Jul. 29, 2025

(54) SYSTEM AND METHOD FOR AN ARTIFICIAL INTELLIGENCE DATA ANALYTICS PLATFORM FOR CRYPTOGRAPHIC CERTIFICATION MANAGEMENT

(71) Applicant: RDW Advisors, LLC., Alexandria, VA (US)

(72) Inventors: Reginald Wilkerson, Alexandria, VA (US); Eddie Fentry, Alexandria, VA (US)

( * ) Notice: Subject to any disclaimer, the term of this patent is extended or adjusted under 35 U.S.C. 154(b) by 303 days.

(21) Appl. No.: 17/936,170

(22) Filed: Sep. 28, 2022

(65) Prior Publication Data

US 2023/0109545 A1  Apr. 6, 2023

Related U.S. Application Data

(60) Provisional application No. 63/249,121, filed on Sep. 28, 2021.

(51) Int. Cl.
| | |
|---|---|
| *H04L 9/32* | (2006.01) |
| *G06N 3/08* | (2023.01) |
| *G06N 3/09* | (2023.01) |
| *G06N 3/096* | (2023.01) |

(52) U.S. Cl.
CPC .............. *H04L 9/3263* (2013.01); *G06N 3/08* (2013.01); *G06N 3/09* (2023.01); *G06N 3/096* (2023.01)

(58) Field of Classification Search
CPC ........... H04L 9/32; H04L 9/3263; G06N 3/08; G06N 3/09; G06N 3/096
See application file for complete search history.

(56) References Cited

U.S. PATENT DOCUMENTS

| | | | |
|---|---|---|---|
| 7,689,615 B2 | 3/2010 | Burges et al. | |
| 8,009,830 B2 | 8/2011 | Orsini et al. | |
| 8,812,870 B2 | 8/2014 | Meunier et al. | |
| 10,853,434 B2 * | 12/2020 | Prelovac | G06F 3/04855 |
| 2021/0142334 A1 * | 5/2021 | Webster | G06N 20/00 |
| 2023/0068465 A1 * | 3/2023 | Bao | G06Q 30/0256 |

OTHER PUBLICATIONS

International Search Report and Written Opinion, issued Feb. 23, 2023, in corresponding PCT Application No. PCT/US2022/045047.

* cited by examiner

*Primary Examiner* — D'Arcy Winston Straub
(74) *Attorney, Agent, or Firm* — Venable LLP; Ryan T. Ward (57) ABSTRACT

Systems, methods, and computer-readable storage media for an artificial intelligence data analytics platform for cryptographic certification management. The system receives a cryptographic certification document with a list of cryptographic product identifications and stores the document in a restricted repository. The system stores the cryptographic certification document, then converts the document to text, resulting in a converted text with the list of cryptographic product identifications. The system, upon receiving a query requesting identification of at least one cryptographic certification within the list of cryptographic product identifications, executes the query on the converted text, and provides the query results to the user in response to the query.

20 Claims, 5 Drawing Sheets

SYSTEM AND METHOD FOR AN ARTIFICIAL INTELLIGENCE DATA ANALYTICS PLATFORM FOR CRYPTOGRAPHIC CERTIFICATION MANAGEMENT

CROSS REFERENCE TO RELATED APPLICATIONS

The present application claims priority benefit to U.S. Provisional Application No. 63/249,121, filed on Sep. 28, 2021, the contents of which are incorporated herein by reference in its entirety.

BACKGROUND

1. Technical Field

The present disclosure relates to a Data Analytics Platform (DAP), and more specifically to a DAP which uses Artificial Intelligence (AI) to manage a cryptographic product repository.

2. Introduction

Timely and accurate information is vital to United States (U.S.) national security and the NSA's Type-1 cryptographic certification mission success. The ability to organize, analyze and capitalize on the intelligent data is a key enabler to senior leadership, allowing them to make timely and data-driven decisions on matters concerning the U.S. Government's cryptographic products. Equally important is having a trained Cybersecurity Certification Management workforce equipped with tools that enable and enforces standardized, efficient and cost-effective program management, agency collaboration, and workflow automation.

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

The United States Cybersecurity and Infrastructure Security Agency (CISA) works to manage and reduce risk to cyber and physical infrastructure. Within CISA, the Cybersecurity Directorate's Office of Product Manager (C2) is currently facing innumerable challenges, most notably: physical resource constraints, inadequate CSCM (Cryptographic Supply Chain Management) specialized training, lack of process standardization, and ineffective collaboration among the disparate systems. Currently, each CSCM department has their own unique way to plan and manage certification efforts. Some are well organized and efficient while others may lack these skills and abilities.

Similar problems can exist for non-government encryption protection. For example, email systems, telecommunications, and other civilian/consumer systems often rely on encryption systems which may become outdated or compromised, and effective mechanisms for ensuring encryption and encryption device management is necessary.

Current problems with the encryption and encryption device management include, but are not limited to:
  Encryption technology is based on static algorithms and techniques that age over time-becoming weak and vulnerable as technology and computing power advance;
  A significant amount of encryption is embedded in weapons, munitions, and platforms that do not modernize quickly;
  High-capacity and quantum computing pose a threat to legacy cryptography;
  Supply-chain vulnerabilities and defense industrial base exploits expose cryptographic products to adversarial collection; and
  Current systems do not talk to one another-they are all maintained and managed in silos.

The system disclosed herein leverages advanced AI technologies and cloud computing to integrate and unify data from multiple sources, improving how intelligence data is gathered, processed, and exploited for intelligence operations. This system automates and enhances a variety of core data collection and task processing across the intelligence domains. The system is modular, scalable, and customizable, providing a consolidated platform that can automate and streamline the cryptographic certification management process, meeting a multitude of business needs.

The system analyzes crypto products (and records of crypto products) stored within a repository/database, and labels each one of cryptoproduct with a risk score based on the business rules of the client storing the cryptographic products. The system can, for example, train/build a neural network model, where the neural network model is trained on labeled product data associated with cryptographic products, and which provides a risk score based upon that labeled product data. For example, the resulting neural network model algorithm can identify features (such as a combination of data attributes) which will contribute to the overall score. The system can also contain an internal flow used to retrain the neural network model. For example, the system can contain a feedback loop within an ICS (Industrial Control System) Platform, where end users can edit/modify the risk ratings of products.

Users of the system can generate a query which is used to search for existing cryptographic products stored or recorded within the repository, and the results of the query can be fed through the neural network to generate risk scores associated with the results. The resulting query results can be, for example, a list of matching cryptographic products with their associated risk scores. Based on those risk scores, the user may need to perform additional review The query process can use Artificial Intelligence (AI) techniques like Natural Language Processing (NLP) and other AI tools to (1) reduce timelines reporting, (2) increase volume of data, and (3) increase accuracy of intelligence reporting, resulting in improved workplace efficiencies. For example, via the AI, the system can produce crypto-specific product search algorithms, as well as specific risk algorithms, to provide a risk score for specific vulnerabilities against the crypto product inventory.

The system can be formed using multiple components/pieces which can be independently managed and can be scaled up/down as needed. For example, the system can be a cloud-based intelligent data platform that utilizes a mix of modern AI technologies to enable data analytics, providing users with greater situational awareness, real-time data-based decision support, and the strategic foresight critical to mission success. The system can be modular, scalable, and customizable, providing a consolidated platform that can automate and streamline the cryptographic certification management process, meeting a multitude of user business needs. For example, the front-end and back-end of the system can be adjustable modules. For example, the front end and back end can be separate modules of code where the front-end is primarily a JavaScript-based application built using node JavaScript which communicates with the back-end database using an ORM (Object Relational Mapping) layer. The back-end module can be primarily a relational database (such as a Postgres (also known as PostgreSQL)) along with open search resources for the AI/machine learning datastore. When operating the system, different microservices can be presented to the user as part of the front-end which the user interacts with. Additional components can include a generic event bus for sending messages to, and communicating with, backend databases. Using the system platform, end-users can collaborate with one another and interact with the data stored in the system.

For example, the system enables seamless communication and collaboration between users and cross-agency teams to better understand and discern decisions made, providing all stakeholders involved with a common operating picture. The system, by providing a consistent platform with access to crypto products belonging to one or more entities, can enable inter- and intra-entity collaboration by breaking down the traditional silos found within singular entities, while also providing a consolidated platform that is adaptable and scalable as missions continue to evolve. The ICS (Industrial Control System) platform contained within the system can provide instantaneous and secured remote access to users inside and outside of secure networks, with different system configurations available based on levels of security, access, authorization, etc. The platform can also reduce operational friction and provide end-users with accurate and easily accessible information to analyze program data. The system can also use relevant use cases to ensure that the solution provided (e.g., a selected crypto product from a query search of available crypto products) is efficacious and applicable to the challenges identified.

The system can further include a data repository, also known as a Cryptographic Product Repository (CPR), of cryptographic products undergoing certification as well as those that have been certified, a Program Management (PM) portal for CSCMs, henceforth, termed the CSCM Program Management Portal (CPMP), and online specialized training plans and training modules for CSCMs.

The CPR can provide senior leaders and stakeholders at all levels with timely, actionable data enabling better insight into the overall state and health of available crypto products. Key features of the CPR can include, but are not limited to: intelligent search of real-time data (e.g., providing insight into what devices are currently in the pipeline, current capabilities, current status); assistance in the optimization of cryptographic product usage across entities, reducing duplication of effort; tracking products (e.g., geographic locations, agencies assigned, community of uses); standardized format for the data to be collected, stored, and reported; customized filters allowing for searches by key words, categories, and product attributes such as "vulnerabilities," "algorithms" and "cease key dates"; and/or customized reports providing users with dashboard metrics according to everyone's unique requirements. The system can combine data from the various source systems that house the crypto product attributes into one database that has been designed for end users to search and interact with the data via the UI (User Interface) of the system.

The system disclosed herein can provide a consolidated platform with a standardized process for managing certification efforts, inter- and intra-agency collaboration, and workflow management throughout the product certification lifecycle as well as for follow-on Engineering Change Proposals (ECP). Features within the consolidated platform can include: a real-time consolidated view of ongoing product certifications and resources aligned to those efforts; a custom view profile which allows profiles to be created with custom views based on user specific roles; a standardized process for CSCMs to more efficiently manage and track certification efforts; data archival (which can ensure historical data retention for effective change control and auditing); real-time collaboration ensures effective collaboration and data sharing between inter- and intra-agency team members and stakeholders; and/or custom reporting provides relevant reporting for specific needs for users at all levels.

Table 1 illustrates system capabilities, and the NLP and Information Retrieval (IR) systems which are used to provide those capabilities. Additional details regarding the specific system domains then follows.

TABLE 1

| System Capabilities | System NLP/IR Domains |
| --- | --- |
| Traditional record filtering, aggregations, report generation | Data storage engines, fuzzy keyword search, clustering/indexing |
| Automated operations in response to released documents/notifications | Optical character recognition, named entity recognition, workflow management systems |
| Natural language search interface | Semantic parsing, seq-to-seq models |

Traditional Keyword and Range Queries

Systems configured as disclosed herein provide users of the platform efficient and frictionless access to a (possibly distributed) cryptographic product inventory. Storing and retrieving structured data is traditionally the domain of relational and NoSQL databases, and in keeping with that tradition the system can use open or closed source search engines to provide baseline searching, filtering, and aggregation capabilities. As an example of an open source search engine, ELASTICSEARCH (ES) provides a number of off-the-shelf features that make it well-suited for the following purposes:

Inherently scalable and available as open source
    Provides wildcard and fuzzy matching
    Support for full-text searches utilizing best matching techniques (such as Okapi BM25 (Best Match 25)) and range queries on numerical/date data
    Plugin architecture for both query and database string analysis/normalization algorithms
    Support for storing high-dimensional vectors Using search engines (such as ES) within the system provides a robust baseline search functionality, giving the system a stable foundation from which more robust machine-assisted search offerings can be provided.

Automated Document Operations

Performing actions on the system in response to released documents/notifications is another capability, and providing this capability allows for an automated Integration Hub. Automatically performing an action on product inventory breaks down into 1) detecting newly released documents in a general document repository, 2) extracting text from said documents, 3) recognizing product identifiers in the text, and 4) performing an action on recognized products.

Several open-source packages provide the ability to extract text from well-structured documents. If the source document is a scanned image (rather than structured text), the system can use OCR (Optical Character Recognition). There are both open source and commercially available software solutions for performing OCR, and the system can utilize any such solution known to one of ordinary skill in the art.

Once text associated with documents is obtained (via a structured document, or via OCR), subsequent recognizing product identifiers in a body of text is an instance of a Named Entity Recognition (NER) problem. Current state-of-the-art in NER solutions typically involves some variant of a Long Short-Term Memory (LSTM) architecture paired with either conditional random fields or a convolutional neural network. In some configurations the system can use a pretrained model, whereas in other configurations the models can be trained or fine-tuned based on product information. For example, the system can take an existing model and fine tune it based on the crypto products that are in scope for a given customer/entity. The system can extract all the product names, create pairs (consisting of aspects such as the customer name, entity, product and/or product name), then fine tune the named entity models.

Detecting newly released documents and performing operations on detected product identifiers is part of the system's, discussed in more detail below with respect to document processing and workflow management section. To briefly summarize here, the workflow management system allows for defining triggers for workflows, which are defined as steps in a directed acyclic graph.

Natural Language Interfaces

Natural Language Interfaces (NLI) aim to bridge the divide between non-technical users of a search system providing queries in human sentences (i.e., standard prose), and the often highly specialized, technical language required to write efficient queries against such systems (generally referred to as query languages, such as SQL (Structured Query Language)). One style of NLI is those found in question-answer (QA) search systems. These systems aim at ranking a corpus of unstructured or semi-structured documents against a provided natural language query, then highlighting and/or returning a relevant snippet from those documents as an answer. The search algorithms for QA systems are typically arranged into a retriever-ranker-reader-generator architecture, where the retriever is a quick algorithm for returning candidate matches (such as Best Match Top 25, aka "BM25") and the reader leverages a neural network (such as transformer architectures) to narrow the search.

Systems configured as disclosed herein provide QA capabilities by utilizing a retriever-reader paradigm. In some configurations this can be done using open source systems, whereas in other configurations the QA capabilities can be done via a closed source system. The resulting QA system allows users to search a collection of product attributes as well as any relevant documents that are associated with a given product via natural language queries.

State-of-the-art QA systems often have difficulty resolving natural language queries that map to database operations, such as numerical range filters, aggregations, and subqueries. There is a second class of NLI which attempts to solve these information retrieval problems by instead converting a natural language query into a valid database query in the syntax of the target database engine. Additionally, there are approaches from the NLP domain, which focus on parsed tree construction and ontology mapping as a means of translating natural language to database query language.

The system can collect the appropriate training data for successful deployment of seq-to-seq (sequence-to-sequence, also known as seq2seq) models currently topping the deep learning leaderboards, then train those models. Those retrieved and trained models can then be used in subsequent natural language queries.

System Architecture

The system has several operational and infrastructural capabilities:

Ability to protect and separate source data according to security designation/desired level of access. As an example, the system can use one common class of operations for (virtually) fetching products and their corresponding attributes. For each security designation/level, the system can create an instance of that class of operations that only allows a user to fetch products for the security level that the user is associated with (this requires obtaining/receiving the user's security level).

Ability to rapidly deploy and fine-tune the platform for new target audiences/mission contexts.

Offers modularized services and utilizes abstractions to quickly operationalize emergent, state-of-the-art technologies. The system can update the database definition file for the new piece of the platform within each environment, allowing deployment by leveraging this common framework.

Can be quickly deployed into diverse target environments and provides insulation against technological drift.

The system moves past Infrastructure-as-Code to provide a Platform-as-Data, allowing for rapid configuration and deployment of capabilities into target environments.

Search Engines

The system provides a Unified Search Operation (USO) to satisfy queries against stored product inventory and related metadata. The metadata includes extracted text from product datasheets, operational security doctrines, and agency certification letters. The Unified Search Operation passes raw query strings to another service with the called the search hinge, which is responsible for transforming and routing the input query to search operations defined for deployed search engines.

Including the search hinge in the architecture allows the system to "fan out" a single search request to multiple search engines, which could contain data at differing security designations. These engines can then individually decide to accept or reject their portion of the request. Separating searchable data into engines according to the stringency of their security requirements additionally ensures that data of one security designation is never stored alongside that of another designation.

Search engines deployed by the system are encapsulated into ICS workflow automation services, which allows the search engines to be stored as data within automation services internal datastores. Whereas many systems store configuration information in the form of files, within the disclosed system the configuration is stored as data, which can be modified or manipulated as needed. This provides a modular open system architecture by defining all system services and data types as mutable records in a centralized datastore, which can then be managed using the ICS workflow automation service's built-in operation framework. A given service's definition within the automation platform can include the set of configuration parameters for the underlying software, as well as details about how the service should be deployed and managed. In the context of a search engine, the effect can be that the parameters for the engine's behavior are now configurable before and after the service is deployed into a given environment. The ICS workflow automation platform can also provide the capability to "hot swap" search engines via an update to the service definition to point to a different version of the engine's source code, or instruct a search operation to use a different search engine service to satisfy incoming requests.

Both the Unified Search Operation and the engine-specific search operation(s) are instances of system workflow automation operation definitions. These definitions provide a specification for the input type, output type, and service that handles a given action within the system, and are also stored as data within automation procedures. Operations are then exposed via an operation API (Application Programming Interface), where role-based access controls can be attached to operations at the user and user group level. In some configurations, this provides the capability to limit access to specific search operations, or the search as a whole, depending on the security needs of the environment the system is deployed into. In certain configurations, the results of a search for crypto products can be filtered or restricted according to the security clearance/authorization level of the user.

In addition to search operations, search engine services within the system can implement the TRAIN and FINE-TUNE operations, where the models underlying each deployed search engine can be trained and/or updated. These operations are available for downstream processes to dynamically update the platform's search capabilities in response to scheduled or dynamic releases of new training data. For example, if feedback from a user was received indicating that the results of a previous query were incomplete or inaccurate, the system can use that feedback to update the search engine(s) which provided those query results. Likewise, if additional training data is released, the system can fine-tune and/or retrain the search engines themselves, or the search handler which selects and deploys the various search engines.

Document Processing and Workflow Management

Consider the following example of using the system. A new document enters the document repository, triggering the first step of the workflow.

A. Step 1 invokes CONVERT, receiving the document's converted text. A document converter fetches the document from the repository and converts it to text.

B. Step 2 invokes IDENTIFY PRODUCTS, providing the converted text and receiving a list of crypto product identifiers.

C. Step 3 invokes SEARCH, providing crypto product identifiers and receiving a list of matching crypto products.

D. Step 4 invokes FLAG PRODUCT, finally marking the crypto products in the document for review by a user. These final results can be displayed to the user or otherwise forwarded to the user, depending on the configuration of the system.

The ability to ingest documents and automatically perform arbitrary actions on some representation of those documents is central to the capabilities of the system, and sets the foundation for a modular integration hub. One such capability is automatically flagging products in a cryptographic inventory in response to decertification messages originating from document repository. When a decertification message is received by the system indicating that a crypto product within the repository is outdated, expiring, compromised, etc., the system can automatically flag that crypto product. At a scheduled time, or when that crypto product is identified within query results, the flag can alert the system that the crypto product should be reviewed by the user before reliance on the crypto product's readiness within the query results.

The system can leverage the automation service definitions, operation definitions, and its workflow management system to 1) detect new decertification messages in a configured document repository, 2) automatically convert the message to a textual representation appropriate for machine processing, 3) perform a set of natural language processing steps to extract product identifiers, and/or 4) use the product identifiers to search for products and tag them appropriately for human review.

The automation workflows are defined as a series of steps stored with a data storage engine and thus are inherently re-usable and reconfigurable. The workflow automation module provides low-code/no-code interfaces for creating and manipulating workflows, serving as the building blocks of the Integration Hub. Low code is primarily utilized by software developers to abstract away pieces of the complexity of the software development supply chain to speed up development and to automate common tasks. With low-code, a developer still has the ability to modify and edit certain aspects of the chain of operations that are being automated. By contrast, no-code is primarily used by business users and no training is involved. No-code is more of a point and click option used to automate a common set of tasks. Each piece of the workflow to manipulate documents can be modularized and standardized as a workflow automation service/operation pair, providing generic functionality that can be offered to other parts of the system and/or used in other processing workflows.

Concrete Search Example

The following example presents the set of operations in the system that would occur if a user were to search the repository for the product family name "Tactical Radios". Within the example, the precondition exists that there is an expanded search database for each product out of relevant text fields (name, type, family, algorithm, etc.) within the search engine(s).

The user enters "Tactical Radios" into the search box and submits the search. The user interface bundles the query into an HTTP (Hypertext Transfer Protocol) payload and submits the HTTP payload to a SEARCH operation within the workflow automation "Operations API." The Operations API finds the handler for SEARCH (the handler is also referred to herein as the Search Hinge service) and provides the HTTP payload to the handler. The Search Hinge inspects the HTTP payload and determines that it should be routed to a search instance. The search instance performs query analysis and normalization on the string "Tactical Radios" then sends the query to one or more search engines. The search engines determine similarity scores for each product's expanded set of text fields utilizing the Best Match 25 (BM25) algorithm to "Tactical Radio", for example by having stemmed "Radios" to "Radio" to increase the chance of matches. The search engines return products with their score to the Search Hinge, which returns the products to the Operations API. The Operations API then returns the identified crypto products to the user interface, which displays the list to the user sorted by their relevance ranking.

Other Configurations

In some configurations, the system can include the aforementioned Integration Hub. Leveraging automation capabilities within the system allows for the rapid definition and configuration of ETL (Extract, Transform, and Load) pipelines, including the source(s) and destination(s) of the data flowing through these pipelines. The system can include a no-code/low-code interface on top of ETL pipeline definitions, forming an Integration Hub where non-technical and technical users can develop and share pipelines. The Integration Hub can also have access to operationalized machine learning models, meaning that any built learning capability can be leveraged as part of an Integration Hub pipeline.

In some configurations, the system can include a searchable knowledge base. In such configurations, the platform can utilize ETL pipelines in the Integration Hub to bring together data around products from official sources as well as reports on risks and vulnerabilities from the larger internet. These data can be collated with contributions from users of the platform and placed behind a unified search API, enabling a single search interface to the universe of data for each product in the system.

In some configurations, the system can further include a recommendation engine. In addition to providing the ability to search for crypto products, the system can recommend crypto products to users of the system based on a crypto product they are currently viewing, products they have viewed in the past, and/or the user's purpose in using the system.

In some configurations, the platform can identify and collect data from everyday user interactions which can then be used to train new machine capabilities or improve the performance of existing models. For example, the system can collect user interactions with crypto product results to train a crypto product recommendation engine, and can collect SQL/NoSQL data emitted by successful searches, to train a deep learning natural language interface for future searches.

In some configurations, the system's search hinge can route search queries based on human-defined rules related to basic analysis of query payloads and structure. For example, the system can include machine learning architectures that would allow the search hinge to predict which of its available search engines would produce the best results for a given query.

In some configurations, the system can include adaptive user interfaces. For example, the system can curate a data set around user flows through the platform. These user flow data can then be operationalized to provide an adapter user interface, which can streamline the user experience by removing unnecessary steps from a wizard flow or automatically starting users in views that are the most relevant to their area of responsibility.

Next, consider the examples illustrated in the figures.

Figure 1:
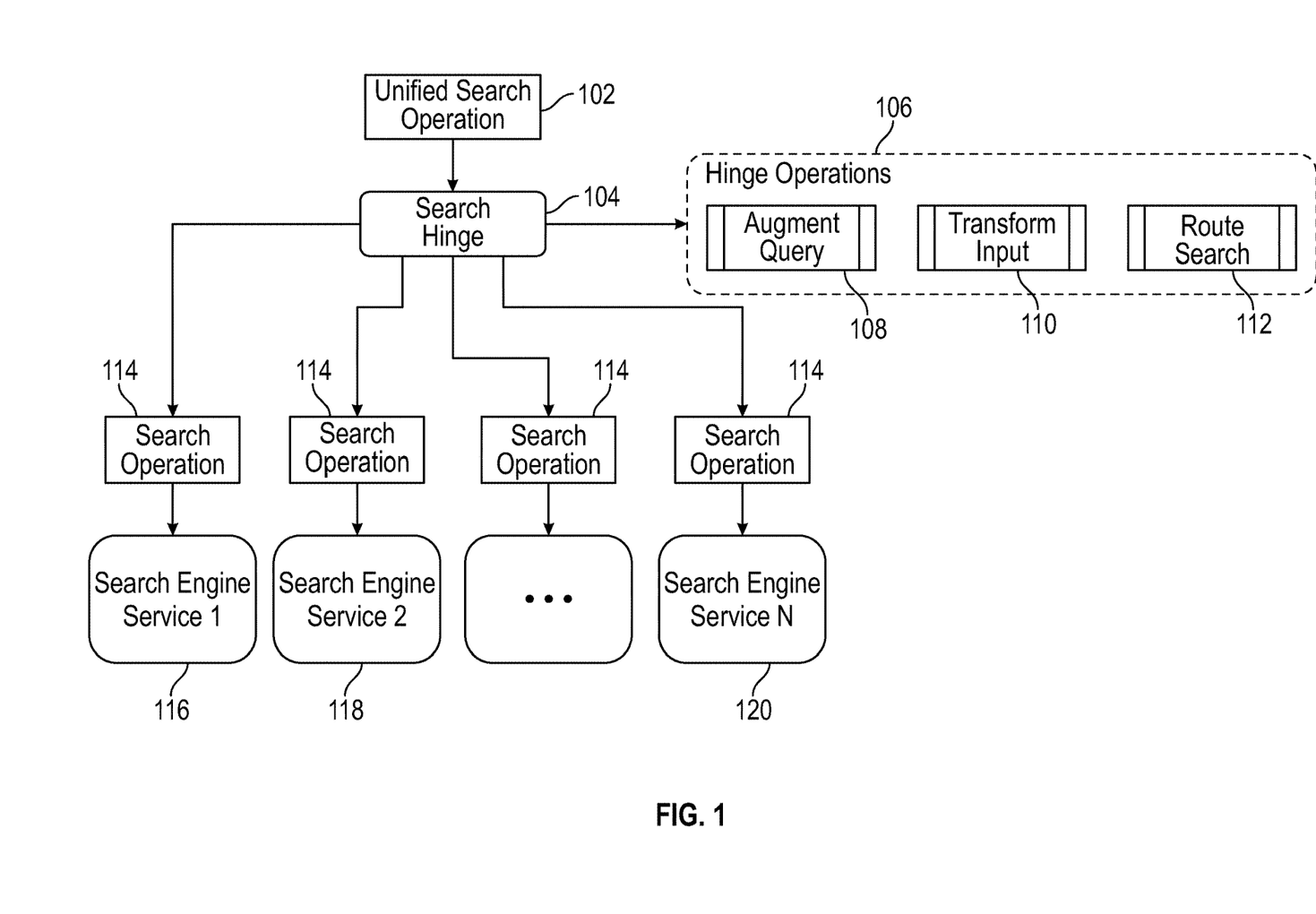
FIG. 1 illustrates an example of search engines managed via an automation framework.

FIG. 1 illustrates an example of search engines managed via an automation framework. As illustrated, the system receives a query, aka a "Unified Search Operation" 102, which is directed to the search hinge 104. The search hinge 104 performs operations 106, such as augmenting the query 108 (e.g., including synonyms, identifying partial components (such as the "radios" example given above), adding additional terms commonly associated with similar searches, etc.), transforming the input 110 (e.g., changing a prose query into a formal query, or vice-versa, depending on the configuration), and routing the search 112 (e.g., selecting one or more of the search engines 116, 118, 120 available to perform search operation 114. Once the search hinge 104 has selected the search engines 116, 118, 120, the search operation 114 (augmented 108 and transformed 110 as necessary) is routed to the selected search engines 116, 118, 120.

Figure 2:
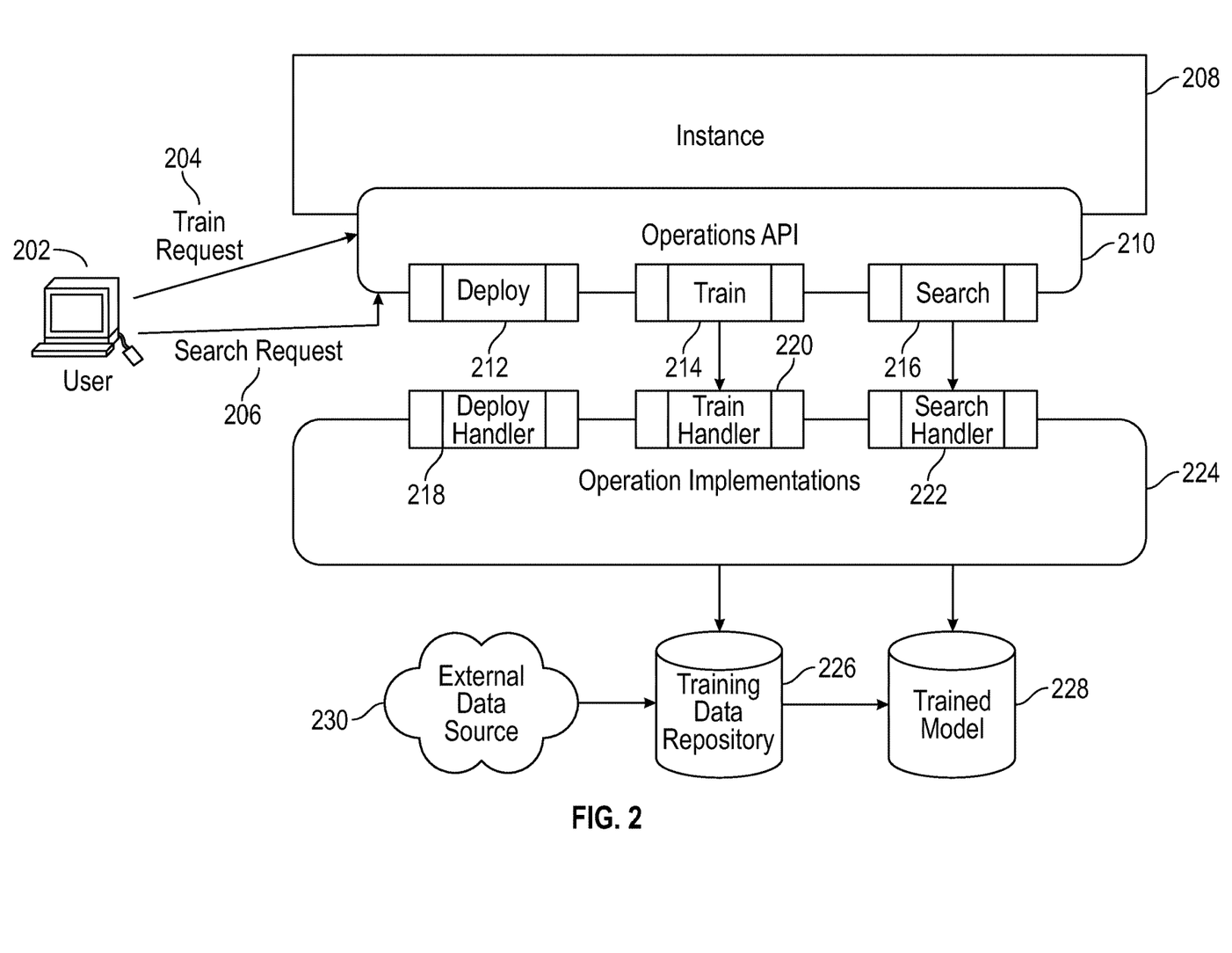
FIG. 2 illustrates exemplary TRAIN and SEARCH request processes.

FIG. 2 illustrates exemplary TRAIN and SEARCH request processes. A TRAIN request 204 sent to the Operations API 210 followed by a SEARCH request 206. The Operations API 210 contains a mapping of each operation definition (deploy 212, train 214, or search 216) to the concrete service or code that can handle the operation, which it then uses to route each received request. The inputs and outputs of an Operation, as well as the handler for the request, can be adjusted in the workflow automation datastore without the need for any code-level changes.

When a user 202 makes a training request 204, the system creates an instance 208 (i.e., a specific allocation of memory within a cloud computing environment associated with the query or training command), which in turn calls an operations API 210. The Operations API 210 can call different operation implementations 224 (e.g., handlers) based on the type of request received. For example, if the request is a training request 204 to train a model, the Operations API 210 recognizes the request as being training 214 and calls the training handler 220. Likewise, if the request is a search request 206, the Operations API 210 recognizes the request as being a search 216 and calls the search handler 222. Yet another category of request can be a deploy request, where the Operations API 210 recognizes the request being instructions to deploy 212 one or more crypto products, and calls the deploy handler 218 to execute that instruction.

When new data is received (such as a new document listing available crypto products), the system receives that new or updated data from an external data source 230, then stores that data within a training data repository 226. When a training request 204 is received and the training handler 220 is executed, the system accesses the data in the training data repository 226, then uses information to train or retrain a model 228. When a search request 206 is received, the search handler 222 is received, then uses the trained model 228 to execute the search. For example, the trained model 228 may identify which search engines are likely to return accurate results, use the least amount of processing time, require the fewest queries, and/or use the least amount of bandwidth, and based on the output of the trained model 228 the system can execute the search in a more efficient manner.

Figure 3:
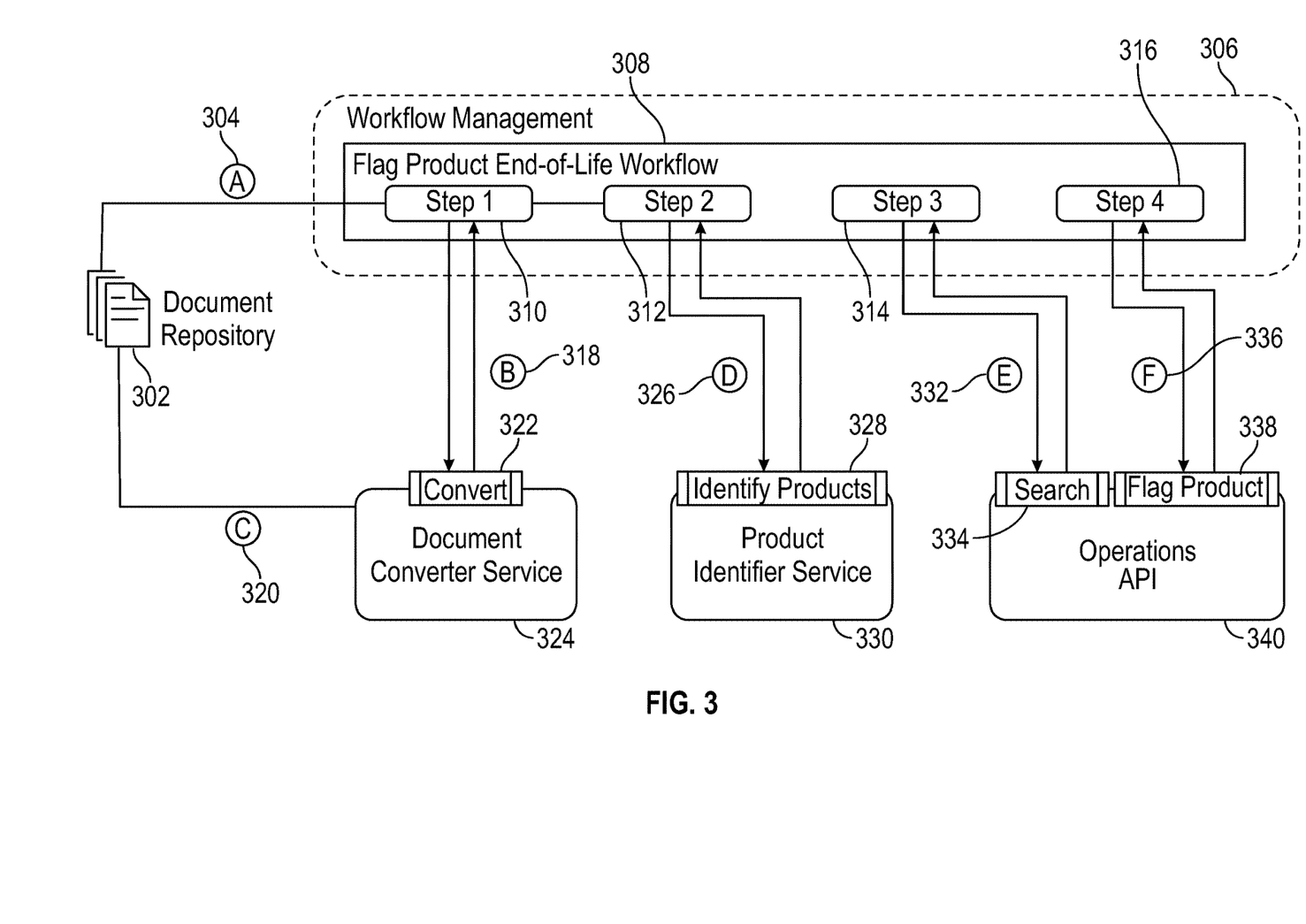
FIG. 3 illustrates an example of operational flow.

FIG. 3 illustrates an example of operational flow triggered in response to a document release, encoded as an automation workflow within the system. As illustrated, a document identifying end-of-life crypto products is saved to the document repository 302 and a notification is sent 304 to the workflow management 306 of the system. The end-of-life workflow 308 then proceeds by:

Step 1 310 of the workflow 308 invokes 318 CONVERT 322. A document converter service 324 fetches 320 the document from the repository 302 and converts it to text.

Step 2 312 invokes 326 IDENTIFY PRODUCTS 328 (as part of a product identifier service 330), providing the converted text obtained in step 1 310 and receiving a list of crypto product identifiers. The Identify products 328 operates by taking the data from using an OCR (Optical Character Recognition) process to extract text from a document, then place the text within a datastore. Once the text is stored within the datastore, the system can use NLP (Natural Language Processing) to identify the various names of a product (e.g., various product identifiers) to identity the exact product that the text/document is related to.

Step 3 314 invokes 332 SEARCH 334 as part of the Operations API 340, providing crypto product identifiers received in step 2 312 and receiving a list of matching (or substantially similar) crypto products.

Step 4 316 invokes 336 FLAG PRODUCT 338, finally marking the crypto products in the document for review by a user. These final results can be displayed to the user or otherwise forwarded to the user, depending on the configuration of the system.

Figure 4:
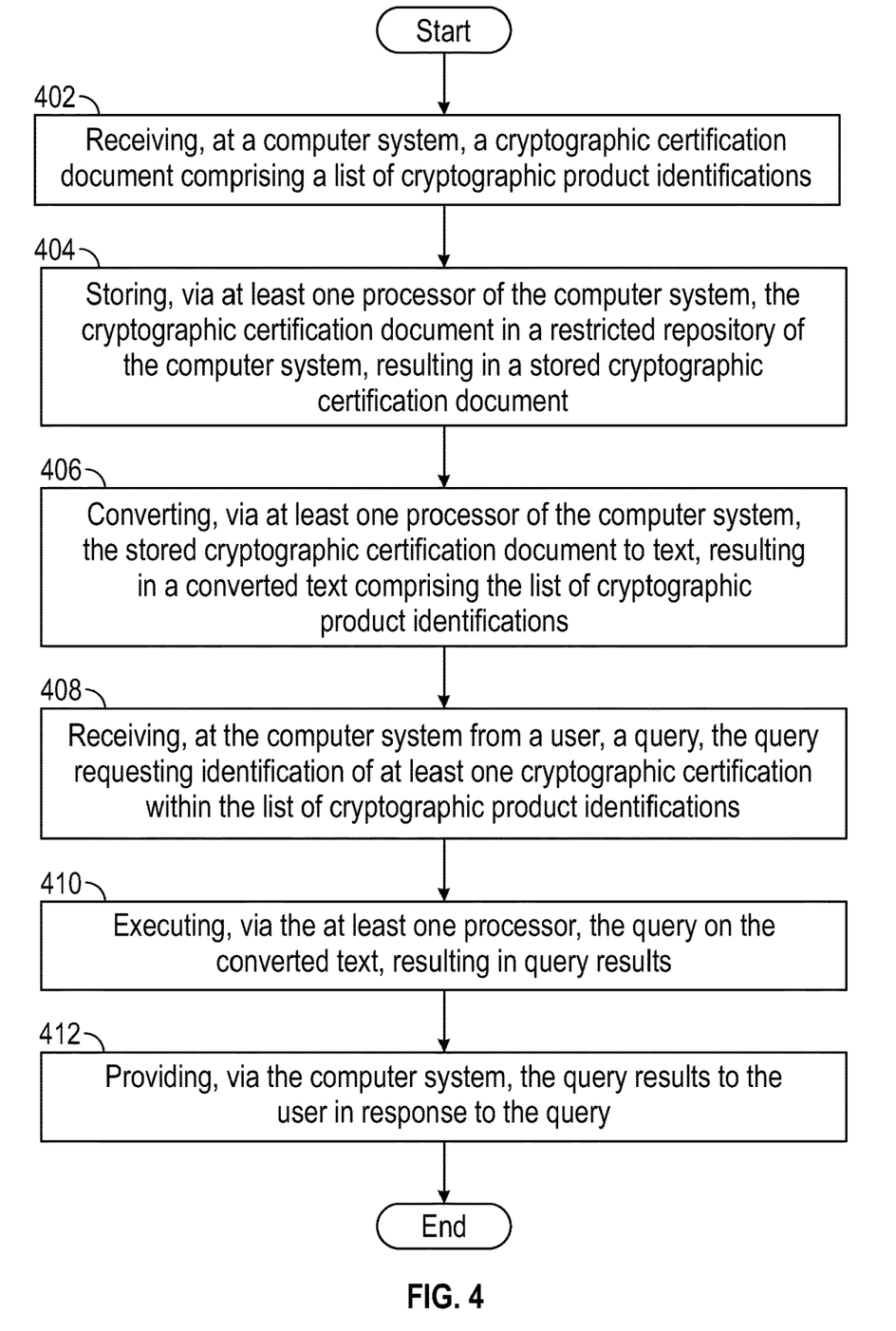
FIG. 4 illustrates an example method embodiment.

FIG. 4 illustrates an example method embodiment. As illustrated, the method can include: receiving, at a computer system, a cryptographic certification document comprising a list of cryptographic product identifications (402) and storing, via at least one processor of the computer system, the cryptographic certification document in a restricted repository of the computer system, resulting in a stored cryptographic certification document (404). The cryptographic certification document can, for example, be a list of different devices that have cryptographic elements or components which are identified as metadata associated with the respective devices. For example, the cryptographic certification document list can list device A having encryption X, which expires on a listed date.

The system then converts, via at least one processor of the computer system, the stored cryptographic certification document to text, resulting in a converted text comprising the list of cryptographic product identifications (406). This can, for example, be accomplished via any known form of OCR (Optical Character Recognition). The system then receives, at the computer system from a user, a query, the query requesting identification of at least one cryptographic certification within the list of cryptographic product identifications (408) and executes, via the at least one processor, the query on the converted text, resulting in query results (410). The system can then provide, via the computer system, the query results to the user in response to the query (412).

In some configurations, the illustrated method can further include: receiving, at a computer system, an authorization level of the user; and modifying, via the at least one processor based on the authorization level, prior to the providing of the query results to the user, the query results, such that results for which the user lacks authorization are removed from the query results.

In some configurations, the illustrated method can further include: identifying, via the at least one processor, at least one of the query results as being decertified, resulting in decertified query results; and flagging, via the at least one processor, the decertified query results as needing review by the user.

In some configurations, the execution of the query causes searches of the restricted repository using a plurality of search engines, each search engine providing search engine results which are aggregated together to form the query results. In such configurations, the method can further include: training, via the at least one processor, a machine learning algorithm using the search engine results and feedback regarding accuracy of the search engine results; and predicting, via execution of the machine learning algorithm by the at least one processor, which search engine within the plurality of search engines will provide best results for the query, wherein inputs to the machine learning algorithm comprise the query and a list of the plurality of search engines, and outputs of the machine learning algorithm comprise a ranking of the plurality of search engines. In addition, in such configurations the execution of the query can be performed using a predetermined number of search engines within the plurality of search engines based on the ranking.

In some configurations, the illustrated method can further include: receiving, at a computer system, an authorization level of the user; and restricting, prior to receiving of the query, search and query options of the user based on the authorization level.

Figure 5:
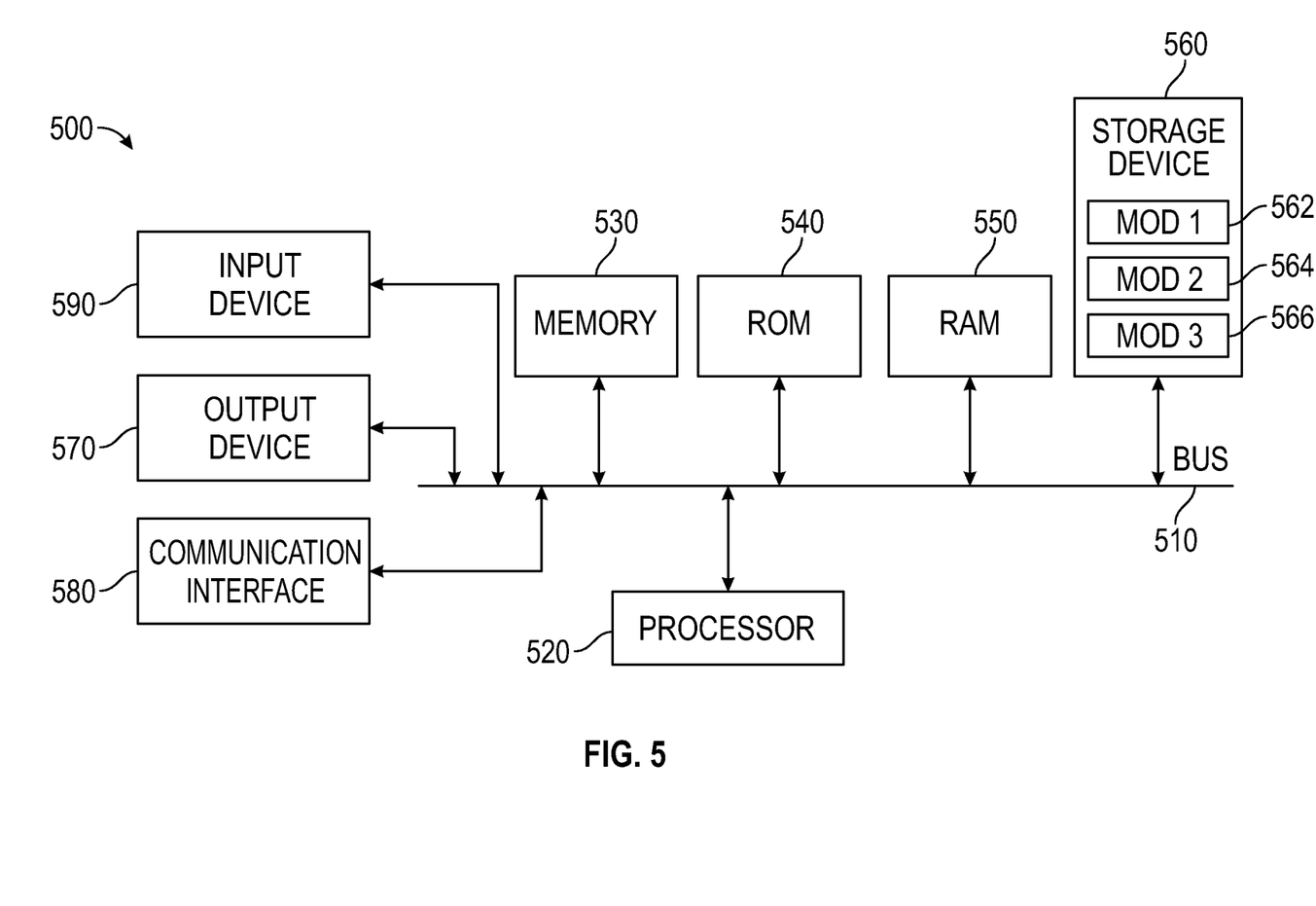
FIG. 5 illustrates an example computer system.

With reference to FIG. 5, an exemplary system includes a general-purpose computing device 500, including a processing unit (CPU or processor) 520 and a system bus 510 that couples various system components including the system memory 530 such as read-only memory (ROM) 540 and random access memory (RAM) 550 to the processor 520. The system 500 can include a cache of high-speed memory connected directly with, in close proximity to, or integrated as part of the processor 520. The system 500 copies data from the memory 530 and/or the storage device 560 to the cache for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer-readable storage media provide nonvolatile storage of computer-readable instructions, data structures, program modules and other data for the computing device 500. In one aspect, a hardware module that performs a particular function includes the software component stored in a tangible computer-readable storage medium in connection with the necessary hardware components, such as the processor 520, bus 510, display 570, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 500 is a small, handheld computing device, a desktop computer, or a computer server.

Although the exemplary embodiment described herein employs the hard disk 560, other types of computer-readable media which can store data that are accessible by a computer, such as magnetic cassettes, flash memory cards, digital versatile disks, cartridges, random access memories (RAMs) 550, and read-only memory (ROM) 540, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:
   receiving, at a computer system, a cryptographic certification document comprising a list of cryptographic product identifications;
   storing, via at least one processor of the computer system, the cryptographic certification document in a restricted repository of the computer system, resulting in a stored cryptographic certification document;
   converting, via the at least one processor of the computer system, the stored cryptographic certification document to text, resulting in a converted text comprising the list of cryptographic product identifications;
   assigning, via the at least one processor executing a neural network model, a risk score for each cryptographic product listed within the list of cryptographic product identifications, resulting in a plurality of risk scores, wherein each risk score in the plurality of risk scores is based on rules of storage locations storing the each cryptographic product;
   receiving, at the computer system from a user, a query, the query requesting identification of at least one cryptographic certification within the list of cryptographic product identifications;
   modifying the query via the at least one processor, such that the query further comprises at least one of (A) partial query components or (B) additional terms associated with the query, resulting in a modified query;
   executing, via the at least one processor, the modified query on the converted text, resulting in query results; and
   providing, via the computer system, the query results with corresponding risk scores from the plurality of risk scores to the user in response to the query.

2. The method of claim 1, further comprising:
   receiving, at the computer system, an authorization level of the user; and
   modifying, via the at least one processor based on the authorization level, prior to the providing of the query results to the user, the query results, such that results for which the user lacks authorization are removed from the query results.

3. The method of claim 1, further comprising:
   identifying, via the at least one processor, at least one of the query results as being decertified, resulting in decertified query results; and
   flagging, via the at least one processor, the decertified query results as needing review by the user.

4. The method of claim 1, wherein the execution of the query causes searches of the restricted repository using a plurality of search engines, each search engine providing search engine results which are aggregated together to form the query results;
   wherein each search engine in the plurality of search engines has a distinct level of security requirement; and
   wherein the at least one processor configures the plurality of search engines according to configuration parameters associated with the query.

5. The method of claim 4, further comprising:
   training, via the at least one processor, a machine learning algorithm using the search engine results and feedback regarding accuracy of the search engine results; and
   predicting, via execution of the machine learning algorithm by the at least one processor, which search engine within the plurality of search engines will provide best results for the query, wherein inputs to the machine learning algorithm comprise the query and a list of the plurality of search engines, and outputs of the machine learning algorithm comprise a ranking of the plurality of search engines.

6. The method of claim 5, wherein the execution of the query is performed using a predetermined number of search engines within the plurality of search engines based on the ranking.

7. The method of claim 1, further comprising:
   receiving, at the computer system, an authorization level of the user; and
   restricting, prior to receiving of the query, search and query options of the user based on the authorization level.

8. A system comprising:
   a restricted repository;
   at least one processor; and
   a non-transitory computer-readable storage medium having instructions stored which, when executed by the at least one processor, cause the at least one processor to perform operations comprising:

receiving a cryptographic certification document comprising a list of cryptographic product identifications;
storing the cryptographic certification document in the restricted repository, resulting in a stored cryptographic certification document;
converting the stored cryptographic certification document to text, resulting in a converted text comprising the list of cryptographic product identifications;
assigning, by executing a neural network model, a risk score for each cryptographic product listed within the list of cryptographic product identifications, resulting in a plurality of risk scores, wherein each risk score in the plurality of risk scores is based on rules of storage locations storing the each cryptographic product;
receiving, from a user, a query, the query requesting identification of at least one cryptographic certification within the list of cryptographic product identifications;
modifying the query via the at least one processor, such that the query further comprises at least one of (A) partial query components or (B) additional terms associated with the query, resulting in a modified query;
executing the modified query on the converted text, resulting in query results; and
providing the query results with corresponding risk scores from the plurality of risk scores to the user in response to the query.

9. The system of claim 8, the non-transitory computer-readable storage medium having additional instructions stored which, when executed by the at least one processor, cause the at least one processor to perform operations comprising:
receiving an authorization level of the user; and
modifying, based on the authorization level, prior to the providing of the query results to the user, the query results, such that results for which the user lacks authorization are removed from the query results.

10. The system of claim 8, the non-transitory computer-readable storage medium having additional instructions stored which, when executed by the at least one processor, cause the at least one processor to perform operations comprising:
identifying at least one of the query results as being decertified, resulting in decertified query results; and
flagging the decertified query results as needing review by the user.

11. The system of claim 8, wherein the execution of the query causes searches of the restricted repository using a plurality of search engines, each search engine providing search engine results which are aggregated together to form the query results;
wherein each search engine in the plurality of search engines has a distinct level of security requirement; and
wherein the at least one processor configures the plurality of search engines according to configuration parameters associated with the query.

12. The system of claim 11, the non-transitory computer-readable storage medium having additional instructions stored which, when executed by the at least one processor, cause the at least one processor to perform operations comprising:
training a machine learning algorithm using the search engine results and feedback regarding accuracy of the search engine results; and
predicting, via execution of the machine learning algorithm by the at least one processor, which search engine within the plurality of search engines will provide best results for the query, wherein inputs to the machine learning algorithm comprise the query and a list of the plurality of search engines, and outputs of the machine learning algorithm comprise a ranking of the plurality of search engines.

13. The system of claim 12, wherein the execution of the query is performed using a predetermined number of search engines within the plurality of search engines based on the ranking.

14. The system of claim 8, the non-transitory computer-readable storage medium having additional instructions stored which, when executed by the at least one processor, cause the at least one processor to perform operations comprising:
receiving an authorization level of the user; and
restricting, prior to receiving of the query, search and query options of the user based on the authorization level.

15. A non-transitory computer-readable storage medium having instructions stored which, when executed by at least one processor, cause the at least one processor to perform operations comprising:
receiving a cryptographic certification document comprising a list of cryptographic product identifications;
storing the cryptographic certification document in a restricted repository, resulting in a stored cryptographic certification document;
converting the stored cryptographic certification document to text, resulting in a converted text comprising the list of cryptographic product identifications;
assigning, by executing a neural network model, a risk score for each cryptographic product listed within the list of cryptographic product identifications, resulting in a plurality of risk scores, wherein each risk score in the plurality of risk scores is based on rules of storage locations storing the each cryptographic product;
receiving, from a user, a query, the query requesting identification of at least one cryptographic certification within the list of cryptographic product identifications;
modifying the query via the at least one processor, such that the query further comprises at least one of (A) partial query components or (B) additional terms associated with the query, resulting in a modified query;
executing the modified query on the converted text, resulting in query results; and
providing the query results with corresponding risk scores from the plurality of risk scores to the user in response to the query.

16. The non-transitory computer-readable storage medium of claim 15, having additional instructions stored which, when executed by the at least one processor, cause the at least one processor to perform operations comprising:
receiving an authorization level of the user; and
modifying, based on the authorization level, prior to the providing of the query results to the user, the query results, such that results for which the user lacks authorization are removed from the query results.

17. The non-transitory computer-readable storage medium of claim 15, having additional instructions stored which, when executed by the at least one processor, cause the at least one processor to perform operations comprising:
identifying at least one of the query results as being decertified, resulting in decertified query results; and flagging the decertified query results as needing review by the user.

18. The non-transitory computer-readable storage medium of claim 15, wherein the execution of the query causes searches of the restricted repository using a plurality of search engines, each search engine providing search engine results which are aggregated together to form the query results;
  wherein each search engine in the plurality of search engines has a distinct level of security requirement; and
  wherein the at least one processor configures the plurality of search engines according to configuration parameters associated with the query.

19. The non-transitory computer-readable storage medium of claim 18, having additional instructions stored which, when executed by the at least one processor, cause the at least one processor to perform operations comprising:
  training a machine learning algorithm using the search engine results and feedback regarding accuracy of the search engine results; and
  predicting, via execution of the machine learning algorithm by the at least one processor, which search engine within the plurality of search engines will provide best results for the query, wherein inputs to the machine learning algorithm comprise the query and a list of the plurality of search engines, and outputs of the machine learning algorithm comprise a ranking of the plurality of search engines.

20. The non-transitory computer-readable storage medium of claim 19, wherein the execution of the query is performed using a predetermined number of search engines within the plurality of search engines based on the ranking.

\* \* \* \* \*